US006447845B1

(12) United States Patent
Nanavati et al.

(10) Patent No.: US 6,447,845 B1
(45) Date of Patent: Sep. 10, 2002

(54) BARRIER COATINGS USING POLYACIDS

(75) Inventors: Shrenik Mahesh Nanavati, Midland, MI (US); John E. Wyman, Sanibel, FL (US); Patrick Jacques Jean Merlin, Neufvilles (BE); Laurence Gallez, Erbisoeul (BE)

(73) Assignees: Dow Corning Corporation, Midland, MI (US); Dow Corning S.A., Seneffe (BE); EG Technology Partners, L.P., Wilmington, MA (US)

( * ) Notice: Subject to any disclaimer, the term of this patent is extended or adjusted under 35 U.S.C. 154(b) by 0 days.

(21) Appl. No.: 09/518,572

(22) Filed: Mar. 3, 2000

(51) Int. Cl.$^7$ .............................. B05D 3/02; B05D 3/06; B32B 13/08
(52) U.S. Cl. .................... 427/383.5; 427/496; 427/508; 428/341; 428/450; 428/451; 428/452
(58) Field of Search ............................. 427/385.5, 496, 427/508; 428/451, 452, 450, 341

(56) References Cited

U.S. PATENT DOCUMENTS

| 3,951,893 A | 4/1976 | Gander | 260/23 |
|---|---|---|---|
| 4,294,950 A | 10/1981 | Kato | 528/14 |
| 4,933,381 A | 6/1990 | Hager | 523/414 |
| 5,215,822 A | 6/1993 | Wyman et al. | 428/447 |
| 5,260,350 A | 11/1993 | Wright | 522/42 |
| 5,368,941 A | 11/1994 | Blizzard et al. | 428/412 |
| 5,374,483 A | 12/1994 | Wright | 428/412 |
| 5,723,183 A | 3/1998 | Williams et al. | 427/409 |
| 5,744,243 A * | 4/1998 | Li et al. | 428/447 |
| 5,932,304 A | 8/1999 | Probst et al. | 428/35.4 |

FOREIGN PATENT DOCUMENTS

| EP | 0 482 961 A2 | 4/1992 | C09D/7/12 |
|---|---|---|---|
| EP | 0 648 823 A1 | 10/1993 | C09D/133/26 |
| EP | 0 698 398 A1 | 2/1996 | A61L/33/00 |
| GB | 1084313 | 9/1967 | G03C/1/00 |
| JP | 002178078 | 9/1988 | |
| JP | 91-125211 | 4/1991 | |
| JP | 5310977 | 11/1993 | |
| JP | 7-03206 | 1/1995 | |
| JP | 91-65483 | 6/1997 | |
| WO | WO 97/01606 | 1/1997 | C09D/5/08 |
| WO | WO 98/31720 | 7/1998 | C08F/230/08 |
| WO | WO 00/64648 | 11/2000 | B27K/7/00 |

* cited by examiner

Primary Examiner—D. S. Nakarani
(74) Attorney, Agent, or Firm—Jim L. De Cesare; Alexander Weitz; Alan Zombeck

(57) ABSTRACT

A process for treating a surface of a substrate to improve the oxygen, carbon dioxide, flavor and odor gas barrier properties of the substrate with an organic acid having at least two acid substituents selected from the group consisting of a polybasic carboxylic acid, a polymer of an unsaturated carboxylic acid and a co-polymer of an unsaturated carboxylic acid, by applying the acid on to the substrate to form a layer, and exposing the layer to moisture. A variety of other types of additives may be included in the coating applied to the substrate with the acid including compounds of the formula $R_aX_{3-a}Si(CH_2)_nY$, a condensation catalyst, a solvent, and/or a filler.

17 Claims, No Drawings

BARRIER COATINGS USING POLYACIDS

FIELD OF THE INVENTION

This invention relates to the preparation of barrier coatings and particularly to flavor, aroma and gas barrier coatings on films for use in packaging.

BACKGROUND OF THE INVENTION

The pharmaceutical and food industries have, over recent years, increasingly provided products in a prepackaged form. Fruit and vegetables for example, apples and tomatoes, meat and cheese are often prepackaged in a tray and the tray and the fruit are covered with a transparent film.

One of the most important requirements for films used for packaging applications is that they should protect products from aromas or odors in the vicinity in which the products are stored, i.e. they should act as barriers to such aromas or odors. Similarly the films are utilized as barriers to prevent strong smelling products contained in packages from tainting the surrounding area with their aroma during storage.

Oxygen barrier coatings are utilized to prevent the ingress of oxygen into products with a view to extending the shelf life of products and carbon dioxide barrier coatings are typically utilized to prevent the release of carbon dioxide from rigid plastic bottles holding carbonated drinks.

U.S. Pat. No. 5,215,822, describes a process of controlling the impermeability of a film to gases by mixing a vinyl benzylamine silane with an ethylenicallyunsaturated carboxylic acid e.g. itaconic acid, in a solvent, solubilising, hydrolyzing and equilibrating the resultant solution and applying a layer of this solution on a corona treated low density polyethylene film and drying the resulting film. The coated film is then subjected to an electron beam radiation to graft the coating to the film surface and further improve the gas barrier properties of the silane coating. The vinyl benzyl amine silane was also co-polymerized with 3-(2-aminoethyl)-aminopropyltrimethoxy silane or gamma aminopropyltriethoxysilaneprior to mixing with the acid. The resultant mixture was then used to coat the relevant substrate. Whilst these coatings gave excellent gas barrier properties at low to moderate relative humidity values, the gas permeability was less satisfactory at very high relative humidity values. In addition the use of electron beam radiation may lead to cross-linking or chain scission in underlying plastics substrates, with concomitant loss of tensile properties.

U.S. Pat. No. 5,368,941 proposes a deformable, abrasion-resistantcoating formulated from at least one multifunctional acrylate monomer, at least one aminofunctional silane, colloidal silica and at least one acrylate-terminatedpolyalkylene oxide. The acrylate-terminated polyalkylene oxide is provided in order to prevent the coating composition from gelling during stripping and is also said to provide the coating with a degree of deformability, without sacrificing abrasion resistance.

Japanese Laid Open (Kokai) No. 09165483 proposes the preparation of a resin composition by reacting an ethylene/vinyl alcohol co-polymer with a variety of alternative compounds including one or more polybasic acid(s) to form a transparent film with good gas barrier, transparency and mechanical properties for use as a packaging material.

Japanese Application No. 91125211/Laid Open (Kokai) No.4325545 describes a composition of a polyester (A), prepared by copolycondensation of a terephthalic acid, a glycol and a polybasic carboxylic acid having at least three carboxyl groups, with a branched polyester,(B). The terephthalic acid was used in the form of a mixture with isophthalic acid and aliphatic dicarboxylic acids and the polybasic carboxylic acid with three or more carboxylic groups is used in one alternative 1,2,4-benzenetricarboxylicacid or 1,2,4,5-benzenetetracarboxylicacid. The resultant product is said to be useful as a heat sealing material for food packaging which prevents the permeation of food flavor through the packaging material.

U.S. Pat. Nos. 5,260,350 and 5,374,483 describe a silicone coating composition which, when cured on a solid substrate either by ultraviolet or electron beam radiation, provides a transparent abrasion resistant coating firmly adhered thereon. The silicone coating is prepared by reacting at least one multifunctionalacrylate monomer with an amino-organofunctionalsilane, mixing the modified silane with at least one acrylic monomer and thereafter adding colloidal silica.

Japanese Laid Open (Kokai) No. 7003206 proposes a composition for a gas barrier coating comprising a water dispersed polymer prepared by emulsion polymerization of an aminosilane of the formula $R^1N(R^2)A^1Si(R^3)_w(OR^4)_z$ where $A^1$ is an alkylene group, $R^1$ is H, lower alkyl or $A^2$—$N(R^5)$—$R^6$; $A^2$ is a direct bond or an alkylene group; $R^2$, $R^5$, and $R^6$ are H or a lower alkyl group; $R^3$ is a lower alkyl group, aryl or an unsaturated aliphatic moiety; $R^4$ is H, lower alkyl or acyl and $R^1$, $R^2$, $R^5$ and/or $R^6$ are H. The resultant polymer is proposed as a gas-barrier coating for a packaging material.

SUMMARY OF THE INVENTION

It is one of the various objects of the present invention to provide a process for treating a surface of a substrate to provide improved gas barrier properties.

The present inventors have surprisingly found that substrates treated with coatings essentially consisting of a polybasic carboxylic acid or a polymer and co-polymer of organic acids, demonstrate excellent gas barrier properties at low to moderate relative humidity values.

Furthermore, the inventors have surprisingly found that substrates treated with a composition of the acid with one or more of a variety of additives demonstrate excellent gas barrier properties at low to moderate relative humidity values.

DETAILED DESCRIPTION OF THE PREFERRED EMBODIMENTS

The present invention is a process for treating the surface of a substrate with an organic acid having at least two carboxylic acid groups, wherein the organic acid is selected from the group consisting of a graft polymer, a polybasic carboxylic acid, a polymer of an unsaturated carboxylic acid and a co-polymer of an unsaturated carboxylic acid, which process comprises applying the acid on to the substrate to form a layer and drying the layer.

The graft polymer is a copolymer molecule comprising a main backbone chain to which side chains of carboxylic acids are attached and the backbone may be any appropriate polymer to which carboxylic acid functional compounds may be grafted. In particular, backbone polymers used in the process of the present invention may be selected from the group consisting of hydroxyethylmethacrylate and polyethylenimine to which any suitable unsaturated carboxylic acid such as itaconic acid may be grafted.

If the organic acid is a polybasic carboxylic acid, it may be selected from the group consisting of itaconic acid, citric acid, succinic acid, ethylenediamine tetracetic acid (EDTA), ascorbic acid, butane tetracarboxylic acid, tetrahydrofuran tetracarboxylic acid, cyclopentane tetracarboxylic acid, and benzene tetracarboxylic acid. Alternatively, if the organic acid is a polymer or copolymer of an unsaturated carboxylic acid, in which case it is preferably selected from the group consisting of itaconic, citraconic, mesaconic, maleic, fumaric, acrylic, methacrylic, sorbic, and cinnamic acids. Co-polymers of the unsaturated carboxylic acids described above may be used with any appropriate unsaturated monomer selected from the group consisting of any other unsaturated carboxylic acid referred to above, ethylene, propylene, styrene, butadiene, acrylamide and acrylonitrile. The polymer or co-polymer preferably has a molecular weight of from 200 to about 1,000,000.

While the organic acid may be used alone to treat the surface of a substrate, it may also include additional components such as a compound (i) of the formula $R_aX_{3-a}Si(CH_2)_nY$, a condensation catalyst (ii) which may be used when compound (i) is added to the acid, a solvent (iii), or a filler (iv).

The organic acid may be used, for example, with a compound (i) of the formula $R_aX_{3-a}Si(CH_2)_nY$ wherein each R is selected from the group consisting of a hydrogen atom and a hydrocarbon group with 1 to 10 carbon atoms per group, for example a saturated or unsaturated aliphatic or aromatic group, for example an alkyl, alkenyl or phenyl group, preferred groups are methyl and ethyl the most preferred of which are methyl groups. Each X is selected from the group consisting of an alkoxy group with 1 to 4 carbon atoms, a halogen atom, an oxime group and an acyloxy group, of these alkoxy groups for example methoxy and ethoxy are preferred and methoxy groups are most preferred. Y is selected from the group consisting of an epoxy group, for example a glycidoxy group or an epoxycycloalkyl group, a methacryloxy group, an acryloxy group, $—NH_2$ and $—NH—(CH_2)_bNH_2$; a is from 0 to 3, and is preferably 0, b is an integer from 1 to 6 and is preferably 2 and n is an integer from 1 to 12 and is preferably from 2 to 4 most preferably 3. Best results are obtained by use of compounds in which each X is a methoxy group a is 0 and n is 3. Most preferably compound (i) is selected from the group consisting of gamma aminopropyltrimethoxysilane, glycidoxypropyl trimethoxysilane, methacryloxypropyl trimethoxysilane, ethylenediaminepropyltrimethoxysilaneand β-(3,4-epoxycyclohexyl)ethyl trimethoxysilane.

The condensation catalyst (ii) may be used with compound (i) to catalyze the cure process. Compound (i), when used in the process of the present invention always contains at least one amine group, and therefore will always self catalyze the cure reaction to some extent. However, the cure may be accelerated by use of a catalyst. Furthermore, compounds of a similar structure not having an amine group present, as used in the examples for comparative purposes, will require a catalyst to at least initiate cure. Any suitable condensation catalyst may be added, for example, tin and titanium compounds or amines may be utilized.

While a process according to the invention may proceed using a solventless system, the acid alone or in combination with for example, compound (i) may be dissolved in a solvent (iii) and subsequently applied from solution. This is usually carried out with a view to reducing the total solids applied and so control coat weight during application particularly in relation to cases where a catalyst is being used. In general, alcohols and blends thereof are suitable solvents because the acid and where used compound (i) is/are soluble therein. The selected solvent must wet the substrate. Preferably, the solvent is non-toxic, and does not extend the drying time of the layer beyond a commercially acceptable period. The amount of solvent may range from about 1 to about 99 parts by weight of the total composition and is preferably from about 50 to about 95 parts by weight of the total composition.

Preferred solvents (iii) are alcohols for example, methanol, ethanol, n-propanol, isopropanol, butanol, and 1-methoxy-2-propanol,the most preferred solvent being methanol. Alternative solvents which may be utilized include an ether, for example ethyl ether, an ester for example ethyl acetate, a hydrocarbon for example cyclohexane, and water.

Any appropriate filler (iv) may be added to the acid alone or with for example compound (i). The filler may be selected from, for example, silica, magnesium oxide, clay, diatomaceous earth, calcium carbonate, finely ground quartz and layered silicates.

Various other optional additives can be added to the acid for treating of the surface of a substrate. These additives may be added as desired and in any amount as long as they do not reduce the performance of the gas barrier coatings as illustrated herein. Examples of additives include additional additives as earlier described, antiblock and slip aides such as stearamide, oleamide, erucamide or polar additives, such as epoxides, polyols, glycidols or polyamines, such as polyethylenimine. Furthermore, colloidal silicas and silanes or other molecules having four alkoxy or other hydrolyzable groups disposed on a single silicone or other organometallic atom, such as tetra ethoxysilane, and the like may be utilized. Wetting agents, such as a polyethoxylated alkyl phenol, may also be added as may pigments and dyes.

In a process according to the invention, the coating layer may be applied on to a wide variety of substrates, including, but not limited to polyolefins, including oriented polypropylene (OPP), cast polypropylene, polyethylene, polystyrene; polyolefin copolymers, including ethylene vinyl acetate, ethylene acrylic acid, ethylene vinyl alcohol (EVOH), ionomers, polyvinyl alcohol and copolymers thereof; polyacrylonitrile; polyvinyl chloride, polyvinyl dichloride, polyvinylidene chloride and polyacrylates Further alternative substrates include polyesters such as polyethylene terephthalate (PET) or polyethylene naphthalate (PEN); polyamides such as nylon 6 or meta-xylene adipamide (MXD6); and polyimides.

Even further possible substrates include polysaccharides, such as regenerated cellulose, glassine or clay coated paper, paperboard or Kraft paper.

The layer applied according to the invention may be applied on to the aforesaid substrates when they are in the form of a film or sheet or molding, though this is not obligatory. The substrate may be a copolymer, a laminate, a blend, a coating or co-extruded or a combination of any of the substrates listed above according to the compatibility of the materials concerned with each other. In addition, the substrate may be in the form of a rigid container made from materials such as polyethylene, polypropylene, polystyrene, polyamide, PET, polymers of EVOH, or laminates containing such materials. The layer can be applied onto a substrate in any desired amount, however, it is preferred that the layer is be applied in an amount of from about 0.05 to about 20 $g/m^2$, the preferred coat weight being from about 0.5 to about 10 $g/m^2$. Coat weights may be determined by gravimetric comparison. The layer can be applied to the substrate by any conventional method, such as spray coating, roll coating, slot coating, meniscus coating, immersion coating, and direct, offset, and reverse gravure coating.

In a process according to the invention the layer is dried. Drying may occur at room temperature or to expedite the drying process the layer may be exposed to heat during the drying process. Generally, the higher the temperature, the faster the layer will dry.

The upper temperature limit for the heating step is the temperature above which the substrate will undergo an unacceptable degree of distortion. In a process according to the present invention it has been found that the layer may be dried to form a coating at any temperature from room temperature up to about 140° C., with temperatures of from about 40° C. to about 120° C. being preferred and temperatures of about 60° C. to about 100° C. being most preferred. The time period over which the layer may be heated is, as might be expected, temperature dependent and at the most preferred temperature range referred to above the resultant coating will become tack free in a period of from 1 to 10 seconds.

In cases where a solvent is present, the heating step in a process according to the invention becomes of increased importance as it not only serves as a means of accelerating the reaction but also serves as a means of evaporating the solvent in the layer.

In cases where compound (i) is utilized in combination with the organic acid the layer is preferably exposed to moisture during the above drying process in order to effect what is thought to be a curing of the layer.

After drying or drying and curing, the resultant coating may be exposed to electron beam irradiation, ultraviolet radiation, gamma radiation, and/or heat and chemical free radical initiators.

If desired, substrates used in a process according to the invention may be pretreated prior to application of the layer, for example, by corona treatment, plasma treatment, metal or metal oxide deposition, acid treatments and/or flame treatments, all of which are known in the art. Furthermore, any of the foregoing substrates may have a primer or primers applied thereon prior to application of the layer. The primers may be applied to the substrates by any appropriate process known in the art, for example, spray coating, roll coating, slot coating, meniscus coating, immersion coating, and indirect, offset, and reverse gravure coating and extrusion coating. Suitable primers may include, but are not limited to carbodiimide (cyanamide), polyethylenimine, and silanes, for example, N-(2-aminoethyl)-3-aminopropyltrimethoxysilane and aminopropyltriethoxysilane.

Substrates treated by a process according to the invention may be subsequently used without further treatment. However, it is possible to bring a second substrate as described above, into contact with the first substrate under adhesive bond forming conditions, in which case the organic acid alone or in combination with other additives serve as a primer or adhesive. This may proceed in a continuous process wherein the acid/adhesive and second substrate are applied on to the first substrate substantially simultaneously. Alternatively a stepwise process may be utilized wherein the layer is initially applied onto the first substrate and subsequently the second substrate is applied onto the layer.

Additional coatings may be for example, metallic top coats for example, metallised coatings using aluminum or alternatively vapor deposited metal oxide coatings of $AlO_x$, $SiO_x$ or $TiO_x$. Packaging requiring metallised or vapor deposition metal oxide coatings may use coatings prepared by a process according to the present invention as primers. There has, for a long time, been a problem with metallised films of this type in that whilst such films provide high barrier levels with respect to gases, aroma and moisture, the metal layer itself is very often a weak point due to surface defects in and/or lack of adhesion of the metallised layer to the flexible plastic substrate.

Oxygen, carbon dioxide, aroma and flavor barrier coatings as prepared by treating substrates using a process according to the invention may be used for a wide variety of packaging containers, for pouches, tubes, bottles, vials, bag-in-boxes, stand-up pouches, gable top cartons, thermoformed trays, brick-packs, boxes, cigarette packs and the like. They may also be used in any application wherein gas, or aroma barrier properties are desired, for example, tires, buoyancy aides and inflatable devices generally.

For packaging applications where a barrier coating as opposed to an adhesive layer is utilized one of the most useful applications is where oriented polypropylenefilm is the substrate. Typically uncoated oriented polypropylene has an oxygen transmission rate (OTR) of approximately 0.0015 $m^3/m^2/day$. With the present coatings, the oxygen transmission rate of the oriented polypropylene substrates can be reduced to less than 0.0003 $m^3/m^2/day$ as measured at 50% relative humidity. In some cases significantly less than 0.0001 $m^3/m^2$/day. As used herein, the terminology "improved gas barrier" refers to a coating which can reduce oxygen transmission rate of the aforementioned uncoated polypropylene film from 0.001 5 $m^3/m^2/day$ to 0.0003 $m^3/m^2/day$ measured at 50% relative humidity.

The invention provides in another of its aspects an oxygen, odor and flavor gas barrier coating composition substantially consisting of an organic acid having two or more acid substituents selected from the group consisting of:

1) a graft polymer having a backbone selected from the group consisting of hydroxyethylmethacrylate and polyethylenimine, with an unsaturated carboxylic acid grafted thereto;

2) a polybasic carboxylic acid selected from the group consisting of itaconic acid, citric acid, succinic acid, EDTA (ethylenediamine tetracetic acid), ascorbic acid, butanetetracarboxylic acid, tetrahydrofuran tetracarboxylic acid, cyclopentane tetracarboxylic acid, and benzene tetracarboxylic acid; and a polymer or copolymer of an unsaturated carboxylic acid selected from the group consisting of itaconic, citraconic, mesaconic, maleic, fumaric, acrylic, methacrylic, sorbic and cinnamic acid;

with one of more of the group consisting of i) a compound of the formula:

wherein each R is selected from the group consisting of a hydrogen atom and a hydrocarbon group with 1 to 10 carbon atoms group, each X is selected from the group consisting of an alkoxy group with 1 to 4 carbon atoms, a halogen atom, an oxime group and an acyloxy group, Y is selected from the group consisting of an epoxy group, a methacryloxy group, an acryloxy group, —$NH_2$ and —NH—$(CH_2)_b NH_2$; a is from 0 to 3 and n is an integer from 1 to 12;

ii) a condensation catalyst;

iii) a solvent selected from the group consisting of an alcohol, ether, ethyl acetate, water, and cyclohexane; and iv) a filler selected from the group consisting of silicone resin, silica, magnesium oxide, clay, diatomaceous earth, calcium carbonate, finely ground quartz, layered silicates.

In order that the invention may become more clear there now follows a detailed description of several coatings prepared according to the present invention. All results in the following Tables are given in $10^{-6}$ m$^3$/m$^2$/day All ratios indicated in parenthesis in the following Tables are on a weight basis. Percentages are based on the weight of solid material in the solution. All the solutions were prepared as 20% solids in the solvent except where otherwise indicated.

to permeate through the sample into the second chamber wherein any oxygen molecules present are transported by the carrier gas to the sensor. The signals received at the sensor are caused by the reaction between the oxygen and hydrogen.

The results from the above tests are shown below in Table 1.

TABLE 1

| Coating composition | Additive | Curing | OTR 50% RH | OTR 80% RH |
|---|---|---|---|---|
| polyacrylic acid (2,000 MW) in water | 0.1% Glucopon 650 EC/HH | dried at R.T. | 28 | 1109 |
| polyacrylic acid (5,000 MW) in water | 0.1% Glucopon 650 EC/HH | dried at R.T. | 7 | 994 |
| polyacrylic acid (450,000 MW) 10% solution in water | 0.1% Glucopon 650 EC/HH | dried at R.T. | 6 | 1096 |
| polymaleic acid (1,000 MW) | — | dried at R.T. | 294 | 1440 |
| poly(itaconic acid) | — | dried at R.T. | 68 | 1480 |
| poly(methylvinylether-co-maleic acid) in water | — | dried at R.T. | 29 | 980 |
| poly(acrylic-co-maleic acid) in water | — | dried at R.T. | 255 | 1196 |
| Itaconic acid-grafted poly(ethylenimine) (1:2) | — | dried at R.T. | 109 | 1004 |
| poly(itaconic acid), potassium salt in water | 0.1% Triton X-100 | dried at R.T. | 21 | 937 |
| Hydroxyethyl methacrylate grafted polyitaconic acid | — | Dried at RT | 74 | 1035 |
| Hydroxyethyl methacrylate grafted polyitaconic acid | — | Dried at RT + EB 10 Mrad, 170 kV | 54 | 1064 |

EXAMPLE 1

Each layer was prepared, then applied onto an oriented polypropylene substrate and assessed using the same process which is exemplified by the following description relating to the assessment of a polymaleic acid.

The following describes the preparation of a polymaleic acid based coating and its application onto an oriented polypropylene substrate and subsequent testing.

A solution was prepared by dissolving 20 g. of polymaleic acid (Belcene 710 obtained from FMC) in 80 g. of HPLC grade methanol obtained from Aldrich. The layer of solution was applied onto freshly corona treated oriented polypropylene film, using an air-driven mechanical bench-top coater, a #3 (green) K-bar (RK coater), theoretical wet deposit 24 μm. The layer was dried for 24 hours, under ambient conditions, before oxygen transmission rate testing.

Typically the ambient conditions were room temperatures (RT) of from 22 to 28° C. at a relative humidity of from 30 to 60% inclusive. The layers were visibly dry within only a few minutes of application but were left to dry for up to 24 hours to ensure that each layer was completely cured prior to oxygen transmission rate testing.

The coat weights were determined to be in the 2 to 3 g/m$^2$ range by measuring the change in weight of the substrate before the layer was applied and after the layer was cured.

The oxygen transmission rate (OTR) for each substrate treated according to a process of the present invention was determined using a MOCON® Ox-Tran 2-20 apparatus using a COULOX® coulometric sensor. Each treated oriented polypropylene sample was clamped into a diffusion cell forming a divide between two chambers. Both chambers were then purged of oxygen using an oxygen free carrier gas, usually a mixture of 3% by volume of hydrogen in nitrogen. Oxygen is introduced into the first chamber and is allowed In the case of the last two results relating to a hydroxyethyl methacrylate grafted polyitaconic acid co-polymer, a comparison was made between two substrates treated by a process according to the invention, one of which was tested for oxygen transmission rate without further treatment and the other of which was treated with an electron beam prior to testing of the oxygen transmission rate. Of these two substrates the latter provided the lowest rate of oxygen transmission at 50 % relative humidity.

EXAMPLE 2

Each composition shown in Table 2 was prepared by dissolving the relevant acid in an appropriate solvent, methanol unless otherwise indicated, and subsequently adding gamma aminopropyltrimethoxysilane into the acid solution. Finally any additional ingredients such as wetting agents and/or catalysts were dissolved in the mixture.

Subsequent to the above preparation step the application and testing steps were carried out as described in Example 1.

The following is a specific example of the process undertaken:

A solution was prepared by dissolving 10 g. of polymaleic acid (Belcene 710 obtained from FMC) in 80 g. of HPLC grade methanol obtained from Aldrich and 10 g. of gamma aminopropyltrimethoxysilane,sold under the trade name Silquest A-1100 from Witco, was added with stirring. Freshly corona treated oriented polypropylene film substrates were treated with the resulting solution using a #3 (green) meter bar obtained from RK. The layer was dried for 24 hours before testing. The oxygen permeability at 50% relative humidity was 0.0000082 m$^3$/m$^2$/d.

Oxygen transfer rates for the coating compositions prepared are provided in Table 2 below. Comparative examples containing the mono-carboxylic acid, acetic acid and acrylic acid monomer are also provided. The numbers in Table 2 shown in parenthesis, i.e., 2/3, 1/1, are the weight ratios of the components of the coating composition.

TABLE 2

| Coating composition | Additive | Curing | OTR 50% RH | OTR 80% RH |
|---|---|---|---|---|
| gamma aminopropyltrimethoxysilane /poly(itaconic acid) (2:3) | — | dried at R.T. | 27 | 120 |
| gamma aminopropyltrimethoxysilane /polyacrylic acid (1:1) | 0.1% Glucopon 650 EC/HH | dried at R.T. | 5.2 | 172 |
| gamma aminopropyltrimetnoxysilane /polymaleic acid (1:1) | — | dried at R.T. | 8.2 | 90 |
| gamma aminopropyltrimethoxysilane /acetic acid (1:1) | — | dried at R.T. | 1071 | 1614 |
| gamma aminopropyltrimethoxysilane /acrylic acid (1:1) | — | dried at R.T. | 501 | 1280 |
| gamma aminopropyltrimethoxysilane /2,4-dihydroxybenzoic acid (1:1) | — | dried at R.T. | 0.9 | 690 |
| gamma aminopropyltrimethoxysilane /citric acid (1:1) | 0.1% Triton X-100 | dried at R.T. | 111 | 1180 |
| gamma aminopropyltrimethoxysilane /butanetetracarboxylic acid (3:2) | 0.1% Triton X-100 | dried at R.T. | 0.6 | 209 |
| gamma aminopropyltrimethoxysilane /ascorbic acid (1:1) | 0.1% Triton X-100 | dried at R.T. | 6 | 518 |
| gamma aminopropyltrimethoxysilane /itaconic acid (1:1) | — | dried at R.T. | 152 | — |
| gamma aminopropyltrimethoxysilane /1,2,4,5-benzene- tetracarboxylic acid (1:1) | — | dried at R.T. | 1 | 156 |
| gamma aminopropyltrimethoxysilane /1,2,4-benzenetricarboxylic acid (1:1) | — | dried at R.T. | 4 | 284 |

EXAMPLE 3

Substrates were treated by a process according to the invention with compositions comprising an acid, a solvent, methanol unless otherwise indicated, and a third constituent as indicated. In each example the substrate was oriented polypropylene unless otherwise indicated. The OTR for untreated polyethylene terephthalate (PET) substrate was 125 at 50% relative humidity and for untreated low density polyethylene (LDPE) was 4443 at 50% relative humidity and as such significant reductions in OTR values are provided when these substrates are treated by a process according to the present invention.

Each composition was prepared using the same procedure as in example 2

Subsequent to the preparation of the compositions, the application of the layer and subsequent steps were carried out as described in Example 1, and the results are shown in Table 3.

TABLE 3

| Coating composition | Curing | OTR 50% RH | OTR 80% RH |
|---|---|---|---|
| glycidoxypropyltrimethoxysilanelpoly(itaconic acid) (1:2) | dried at R.T. | 2.5 | 622 |
| glycidoxypropyltrimethoxysilanelpolyitaconic acid (1:1) | dried at R.T | 3.7 | 496 |
| potassium polycarboxylate/polyitaconic acid | dried at R.T | 21 | 937 |
| polyitaconic acid/SR 415 10:1, | dried at R.T EB 15 Mrad, 170 kV | 108 | 812 |
| poly(itaconic acid)/amorphous polyethylene terephthalate (10:1), | dried at R.T EB 10 Mrad, 170 kV | | 719 |
| poly(itaconic acid)/3-amino-1-propanol vinylether (10:1) | dried at R.T EB 10 Mrad, 170 kV | | 644 |
| poly(itaconic acid)/ Glycidoxypropyltrimethoxysilane (1:1) on 12 μm PET | dried at R.T | 40 | 86 |
| poly(itaconic acid)/ Glycidoxypropyltrimethoxysilane (1:1) on 50 μm LDPE | dried at R.T | 329 | |
| EDTA/ ethylenediaminepropyltrimethoxysilane (1:1) in a 20% solution in water with Glucopon 650 EC/HH | dried at R.T | 45 | 1095 |
| poly(itaconic acid)/ methacryloxypropyltrimethoxysilane (10:1) | Dried at RT + EB 10 Mrad, 170 kV | 73 | 732 |
| poly(itaconic acid)/SR 415 (10:1) | Dried at RT + EB 15 Mrad, 170 kV | 108 | 812 |

In the above example several of the resultant coatings were subsequently treated with electron beam radiation (EB).

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A process for the preparation of a barrier coating comprising the steps of:
    applying an organic acid to a substrate to form a layer, and drying the layer; wherein the organic acid has at least two acid groups and is selected from the group consisting of a graft polymer, a polybasic carboxylic acid, a polymer of an unsaturated carboxylic acid, and a co-polymer of an unsaturated carboxylic acid, and the organic acid is mixed with one or more components selected from the group consisting of:

i) a compound of the formula

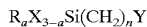

wherein each R is selected from the group consisting of a hydrogen atom and a hydrocarbon group with 1 to 10 carbon atoms; each X is selected from the group consisting of an alkoxy group with 1 to 4 carbon atoms, a halogen atom, an oxime group, and an acyloxy group; Y is selected from the group consisting of an epoxy group, a methacryloxy group, an acryloxy group, —$NH_2$, and —NH—$(CH_2)_b NH_2$; a is from 0 to 3; n is an integer from 1 to 12; and b is an integer from 1 to 6;

ii) a condensation catalyst;

iii) a solvent selected from the group consisting of an alcohol, an ether, an ester, a hydrocarbon, and water; and iv) a filler selected from the group consisting of silicone resins, silica, magnesium oxide, clay, diatomaceous earth, calcium carbonate, finely ground quartz, and layered silicates.

2. A process according to claim 1 wherein the polybasic carboxylic acid is selected from the group consisting of itaconic acid, citric acid, succinic acid, ethylenediaminetetracetic acid, ascorbic acid, butanetetracarboxylic acid, tetrahydrofuran tetracarboxylic acid, cyclopentane tetracarboxylic acid, and benzene tetracarboxylic acid.

3. A process according to claim 1 wherein the unsaturated carboxylic acid is selected from the group consisting of itaconic, citraconic, mesaconic, maleic, fumaric, acrylic, methacrylic, sorbic, and cinnamic acid.

4. A process according to claim 1 wherein the co-polymers are made with an unsaturated monomer selected from the group consisting of ethylene, propylene, styrene, butadiene, acrylamide, and acrylonitrile.

5. A process according to claim 1 wherein each X is an alkoxy group and a is 0.

6. A process according to claim 1 wherein each n is from 2 to 4.

7. A process according to claim 1 wherein each X is a methoxy group, a is 0, and n is 3.

8. A process according to claim 1 wherein Y is selected from the group consisting of a glycidoxy group, a β-(3,4-epoxycycloalkyl) group, an amine group, an ethylenediamine group, and a methacryloxy group.

9. A process according to claim 1 wherein the compound i) is selected from the group consisting of gamma-aminopropyltrimethoxysilane, glycidoxypropyltrimethoxysilane, methacryloxypropyltrimethoxysilane, ethylenediaminepropyltrimethoxysilane, and (3,4epoxycyclohexyl)ethyltrimethoxysilane.

10. A process according to claim 1 wherein the dried layer has a coating weight of from 0.5 to 3 g/m².

11. A process according to claim 1 wherein the substrate is selected from the group consisting of oriented polypropylene, cast polypropylene, polyethylene, polystyrene, ethylene vinyl acetate, ethylene acrylic acid, ethylene vinyl alcohol, polyvinyl alcohol, polyacrylonitrile, polyvinyl chloride, polyvinyl dichloride, polyvinylidene chloride, and polyacrylates.

12. A process according to claim 1 wherein the substrate is selected from the group consisting of polyethylene terephthalate, polyethylene naphthalate, nylon, and polyimides.

13. A process according to claim 1 wherein the substrate is selected from the group consisting of regenerated cellulose, glassine, clay coated paper, paperboard, and Kraft paper.

14. A process according to claim 1 wherein the substrate is a metallized polymer film or a vapor deposited metal oxide coated polymer film of $AlO_x$, $SiO_x$ or $TiO_x$.

15. A process according to claim 1 wherein the layer is heated to a temperature of from 60 to 100° C.

16. A process according to claim 1 wherein subsequent to drying the layer, the substrate is treated with electron beam radiation, ultraviolet radiation, gamma radiation, and/or an heat and chemical free radical initiator.

17. A treated substrate prepared according to the process defined in claim 1.

* * * * *